(12) United States Patent
Moriya et al.

(10) Patent No.: US 7,031,965 B1
(45) Date of Patent: Apr. 18, 2006

(54) IMAGE RETRIEVING AND DELIVERING SYSTEM AND IMAGE RETRIEVING AND DELIVERING METHOD

(75) Inventors: Yoshimi Moriya, Tokyo (JP); Hirofumi Nishikawa, Tokyo (JP); Yoshihisa Yamada, Tokyo (JP); Fuminobu Ogawa, Tokyo (JP); Kohtaro Asai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 393 days.

(21) Appl. No.: 09/624,253

(22) Filed: Jul. 24, 2000

Related U.S. Application Data

(63) Continuation of application No. PCT/JP00/01789, filed on Mar. 23, 2000.

(51) Int. Cl.
*G07F 17/30* (2006.01)

(52) U.S. Cl. .................. 707/10; 707/1; 707/7; 386/46

(58) Field of Classification Search .......... 707/102, 707/200, 104.1, 3, 7, 10, 103; 386/46, 69, 386/125
See application file for complete search history.

(56) References Cited

U.S. PATENT DOCUMENTS

| 5,838,967 | A | * | 11/1998 | Okayama et al. ........... 707/200 |
| 6,070,167 | A | * | 5/2000 | Qian et al. .................. 707/102 |
| 6,269,379 | B1 | * | 7/2001 | Hiyama et al. ........... 707/104.1 |
| 6,411,724 | B1 | * | 6/2002 | Vaithilingam et al. ... 707/104.1 |
| 6,504,990 | B1 | * | 1/2003 | Abecassis ..................... 386/46 |

FOREIGN PATENT DOCUMENTS

CN 1165604 A 11/1997

* cited by examiner

*Primary Examiner*—Charles Rones
*Assistant Examiner*—Hassan Mahmoudi
(74) *Attorney, Agent, or Firm*—Birch, Stewart, Kolasch & Birch, LLP

(57) ABSTRACT

In an image retrieving and delivering system and an image retrieving and delivering method, a feature descriptor is retrieved from a data base, in which each of a plurality of images including a moving picture and a static picture is registered with a feature descriptor describing the feature of the image, according to a retrieval condition input by a user, a retrieval result satisfying the retrieval condition is obtained, and the retrieval result is edited and processed according to a delivery condition obtained from a user terminal in which the retrieval result is to be received.

22 Claims, 7 Drawing Sheets

EXAMPLE OF OUTPUT TO PORTABLE TELEPHONE DISPLAY

EXAMPLE OF OUTPUT TO PC DISPLAY ial Appli-
IMAGE RETRIEVING AND DELIVERING SYSTEM AND IMAGE RETRIEVING AND DELIVERING METHOD

CROSS-REFERENCE TO THE RELATED APPLICATION

This application is a continuation of International Application No. PCT/JP00/01789, whose International filing date is Mar. 23, 2000, the disclosures of which Application are incorporated by reference herein.

BACKGROUND OF THE INVENTION

Field of the Invention

The present invention relates to an image retrieving and delivering system and an image retrieving and delivering method in which a feature degree and/or format information are extracted from each piece of image data such as a moving picture, a static picture or the like recorded in an analog or digital form, one piece of image data is retrieved by using the extracted feature degree of the image data, a format of the image data obtained as a retrieval result is converted according to a processing capability of a user terminal in which the image data is to be received, and the image data is delivered to the user terminal.

Description of Related Art

A system described in "Open type image data base GIRLS aiming at a medium of a network type multimedia information" (Shingaku technical reports) provides an example of a conventional image retrieving and delivering system operated with a network. In this system, pieces of image data scattered on a network are collected by using the World Wide (WWW) functioning as an information providing system on the network, a data base of the pieces of image data is automatically produced, and a piece of desired image data is retrieved from the produced data base.

First, the WWW is described. In the WWW, image data is expressed as a document of a hyper text file (hereinafter, called an HTML file) described by a language called a Hyper Text Makeup Language (HTML). Also, in the HTML, link information to another HTML file or another piece of image data is described by using a network address called a universal resource locator (URL). When a URL of an HTML file or a piece of image data is specified, an asynchronous transfer can be performed for information positioned at a network address of the URL according to a protocol called an Hyper Text Transfer Protocol (HTTP).

Here, returning to the description of the conventional image retrieving and delivering system, the conventional system is composed of a data base structuring unit and a data base searching unit. First, in the data base structuring unit, pieces of link information are traced one after another from a certain URL to collect pieces of information, and a data base of the pieces of information is automatically structured. Specifically, image data relating to an HTML file corresponding to the certain URL is transferred to the data base structuring unit by using the HTTP. Thereafter, the image data relating to the HTML file is analyzed in the data base structuring unit to take out an image and a link to another HTML file from the image data. Thereafter, an image processing is performed for the obtained image in the data base structuring unit to extract a feature degree from the image, and supplementary information is extracted from the HTML file in which the URL of the image is described. Here the supplementary information indicates, for example, the URL of the image. The feature of the extracted image, the supplementary information and a contracted image of the image data are registered in the data base by the function of the data base structuring unit.

Also, in the data base searching unit, image data close to a user's request is retrieved according to the features of the images registered in the data base. The retrieved image data is converted into an HTML file, and the user can read the HTML file by using a WWW browser.

In a conventional image retrieving and delivering system with the above configuration, because it is assumed that client terminals such as a personal computer and a work station respectively connected with an internet, to which image data obtained as a retrieval result is to be delivered, have almost the same processing capability as each other, the image data obtained as the retrieval result is edited and processed in only a predetermined format, and the image data obtained as the retrieval result is delivered to the client terminal. Therefore, in cases where a processing a capability of the user's terminal is low, there is a problem that the user cannot use the conventional image retrieving and delivering system.

SUMMARY OF THE INVENTION

The present invention is provided to solve the above problem, and an object of the present invention is to obtain an image retrieving and delivering system and an image retrieving and delivering method in which image data obtained as a retrieval result is delivered in a format corresponding to a processing capability of each terminal (for example, a portable telephone, a visual telephone, a personal computer or the like) to the terminal through one of various types of networks such as a radio type network.

An image retrieving and delivering system according to the present invention comprises a data base for registering an image including a time-varying picture or a static picture with a feature descriptor or a plurality of feature descriptors of the image, image retrieving means for retrieving the feature descriptor or the feature descriptors registered in the data base according to a retrieval condition input by a user and obtaining a retrieval result satisfying the retrieval condition, and contents additional service means for editing and processing the retrieval result according to a delivery condition obtained from a user terminal side on which the retrieval result is to be received. Therefore, because an output form of the retrieval result and a format of an output image are edited and processed according to the delivery condition of the user terminal side, the retrieval result can be easily displayed in each of various types of terminals having processing capabilities different from each other.

In an image retrieving and delivering system according to the present invention, the contents additional service means comprises terminal information obtaining means for obtaining terminal information of the user terminal as the delivery condition. Therefore, because an output form of the retrieval result and a format of an output image are edited and processed according to a processing capability of the user terminal, the retrieval result can be easily displayed in each of various types of terminals having processing capabilities different from each other.

In an image retrieving and delivering system according to the present invention, the contents additional service means produces data, which relates to the retrieval result and of which the reception in the user terminal is possible, according to the delivery condition specified by the user and transmits the data to the user terminal before the transmission of the retrieval result. Therefore, the user can easily retrieve a desired image from images of various kinds of retrieval results.

An image retrieving and delivering system according to the present invention further comprises contents description meta-data producing means for extracting a feature degree of each of a plurality of input images and format information of the input image and producing a feature descriptor or a plurality of feature descriptors of each input image, and data storing unit for registering the feature descriptor or the feature descriptors produced by the contents description meta-data producing means and the input image relating to the feature descriptor or the feature descriptors in the data base. Therefore, the data base having the feature descriptor or the feature descriptors which can be easily compared with the delivery condition can be obtained from each of various types of terminals having processing capabilities different from each other.

In an image retrieving and delivering system according to the present invention, the contents additional service means comprises converting means for converting an image format and an output format in the image of the retrieval result into those suitable for the terminal information of the user terminal, filtering means for performing no transmission of the retrieval result which does not suit the terminal information, or replacing means for replacing the retrieval result not suitable for the terminal information with substitutive data suitable for the terminal information. Therefore, the retrieval result can be easily displayed in each of various types of terminals having processing capabilities different from each other.

In an image retrieving and delivering system according to the present invention, the contents additional service means transmits the retrieval result, which is not edited or processed, to another terminal specified by the user in advance when the retrieval result is edited and processed according to the terminal information of the user terminal. Therefore, the retrieval result can be easily displayed in each of various types of terminals having processing capabilities different from each other.

In an image retrieving and delivering system according to the present invention, the contents additional service means comprises a plurality of editing means for respectively editing and processing the retrieval result not suitable for the terminal information of the user terminal, and the plurality of editing means are properly selectable in one of an image retrieval requiring side, an image retrieval performing side and a contents providing side on which the images are registered in the data base. Therefore, the retrieval can be performed while reflecting an intention of the image retrieval requiring side, the image retrieval performing side or the contents providing side.

In an image retrieving and delivering system according to the present invention, the image format includes at least one of a sign format of the image of the retrieval result, a bit rate, a frame rate, a resolution degree and a file size. Therefore, the retrieval result can be easily displayed in each of various types of terminals having processing capabilities different from each other.

In an image retrieving and delivering system according to the present invention, the contents additional service means produces the data, which relates to the retrieval result and of which the reception in the user terminal is possible, according to copyright information and/or a distribution condition of the image of the retrieval result. Therefore, the user can easily retrieve a desired image from images of various kinds of retrieval results.

An image retrieving and delivering system according to the present invention comprises a data base for registering an image including a moving picture or a static picture with a feature descriptor or a plurality of feature descriptors of the image, image retrieving mean for retrieving the feature descriptor or the feature descriptors registered in the data base according to a retrieval condition input by a user and obtaining a retrieval result satisfying the retrieval condition, output control means for transmitting the retrieval result and the feature descriptor or the feature descriptors relating to the retrieval result to a user terminal, and contents description meta-data analyzing means, arranged in the user terminal, for analyzing the feature descriptor or the feature descriptors transmitted from the output control means and determining whether or not the retrieval result is to be received. Therefore, because the user can distinguish the retrieval result by analyzing the feature of the image of the retrieval result and meta-data describing a format of the image, the retrieval result can be easily displayed in each of various types of terminals having processing capabilities different from each other.

An image retrieving and delivering method according to the present invention comprises an image retrieving step of retrieving a feature descriptor or a plurality of feature descriptors of an image registered in a data base according to a retrieval condition input by a user and obtaining a retrieval result satisfying the retrieval condition, and a contents additional service step of editing and processing the retrieval result according to a delivery condition obtained from a user terminal side on which the retrieval result is to be received. Therefore, because an output form of the retrieval result and a format of an output image are edited and processed according to the delivery condition of the user terminal side, the retrieval result can be easily displayed in each of various types of terminals having processing capabilities different from each other.

In an image retrieving and delivering method according to the present invention, the contents additional service step includes a step of obtaining terminal information of the user terminal as the delivery condition. Therefore, because an output format of the retrieval result and a format of an output image are edited and processed according to a processing capability of the user terminal, the retrieval result can be easily displayed in each of various types of terminals having processing capabilities different from each other.

In an image retrieving and delivering method according to the present invention, the contents additional service step includes a step of producing data, which relates to the retrieval result and of which the reception in the user terminal is possible, according to the delivery condition specified by the user and a step of transmitting the data to the user terminal before the transmission of the retrieval result. Therefore, the user can easily retrieve a desired image from images of various kinds of retrieval results.

An image retrieving and delivering method according to the present invention further comprises a contents description meta-data producing step of extracting a feature degree of the image and format information of the image when the image is input and producing the feature descriptor or the feature descriptors, and a data storing step of registering the feature descriptor or the feature descriptors, produced in the contents description meta-data producing step and the input image in the data base. Therefore, a database having the feature descriptor or the feature descriptors which can be easily compared with the delivery condition can be obtained from each of various types of terminals having processing capabilities different from each other.

In an image retrieving and delivering method according to the present invention, the contents additional service step includes at least one of a converting step of converting an image format and an output format in the image of the retrieval result into those suitable for the terminal information of the user terminal, a filtering step of performing no transmission of the retrieval result which does not suit the terminal information, and a replacing step of replacing the retrieval result not suitable for the terminal information with substitutive data suitable for the terminal information. Therefore, the retrieval result can be easily displayed in each of various types of terminals having processing capabilities different from each other.

In an image retrieving and delivering method according to the present invention, the contents additional service step includes a step of transmitting the retrieval result, which is not edited or processed, to another terminal specified by the user in advance when the retrieval result is edited and processed according to the terminal information of the user terminal. Therefore, the retrieval can be performed while reflecting an intention of the image retrieval requiring side, the image retrieval performing side or the contents providing side.

In an image retrieving and delivering method according to the present invention, the contents additional service step includes a step of producing the data, which relates to the retrieval result and of which the reception in the user terminal is possible, according to copyright information and/or a distribution condition of the image of the retrieval result. Therefore, the user can easily retrieve a desired image from images of various kinds of retrieval results.

An image retrieving and delivering method according to the present invention comprises an image retrieving step of retrieving a feature descriptor or a plurality of feature descriptors of an image registered in a data base according to a retrieval condition input by a user and obtaining a retrieval result satisfying the retrieval condition, an output control step of transmitting the retrieval result and the feature descriptor or the feature descriptors relating to the retrieval result to a user terminal, and a contents description meta-data analyzing step of analyzing the feature descriptor or the feature descriptors transmitted in the output control step and determining on the user terminal side whether or not the retrieval result is to be received. Therefore, because the user can distinguish the retrieval result by analyzing the feature of the image of the retrieval result and meta-data describing a format of the image, the retrieval result can be easily displayed in each of various types of terminals having processing capabilities different from each other.

DETAILED DESCRIPTION OF THE PREFERRED EMBODIMENTS

The invention will now be described with reference to the accompanying drawings.

Embodiment 1

Figure 1:
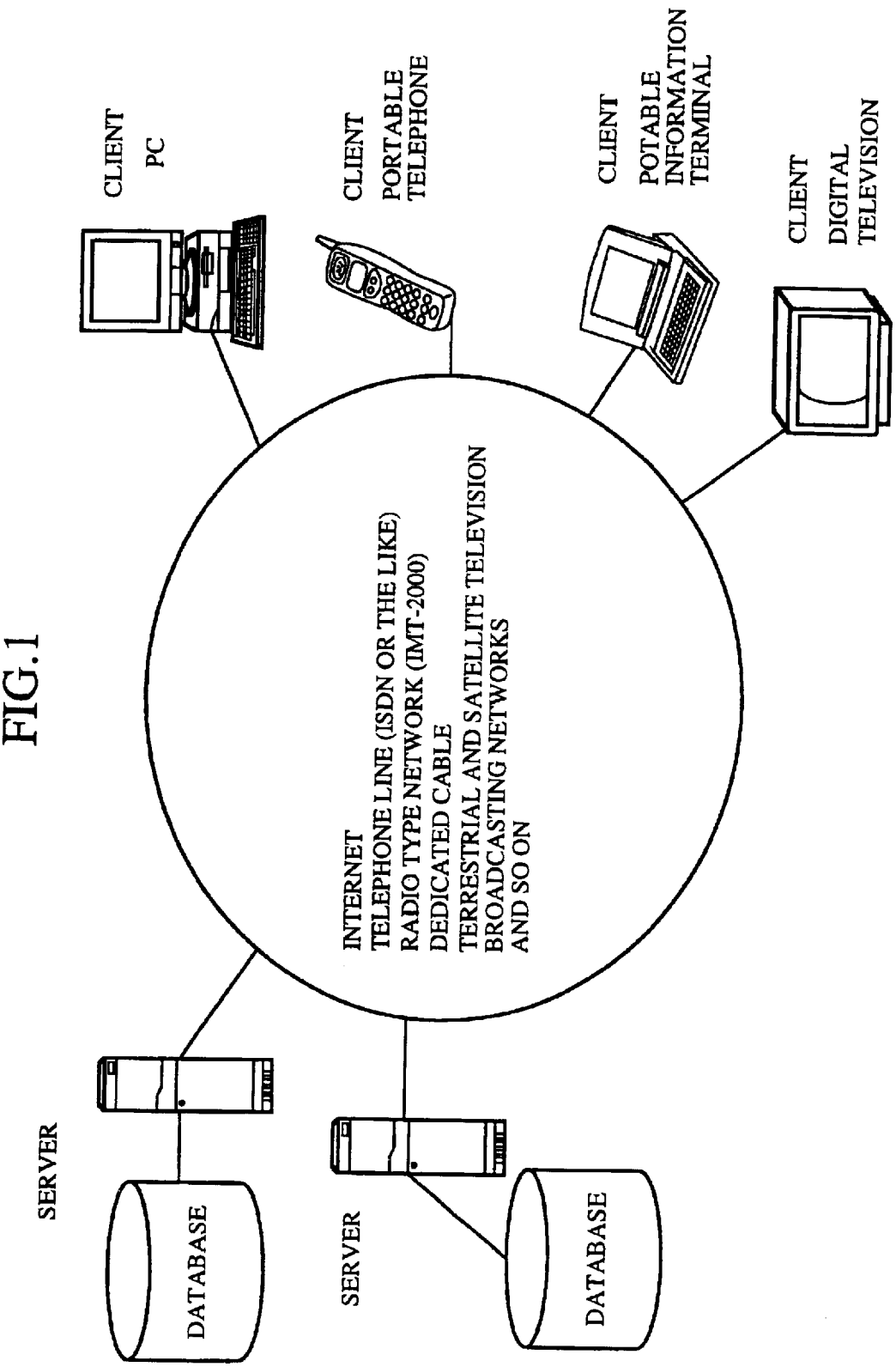
FIG. 1 is a diagram showing the whole configuration of an image retrieving and delivering system according to the present invention.

FIG. 1 is a diagram showing the whole configuration of an image retrieving and delivering system according to the present invention.

As shown in FIG. 1, clients, to which image data obtained as a retrieval result is delivered, may be formed of various terminals such as a personal computer, a portable telephone, a portable information terminal, a digital television and the like. Such terminals have processing capabilities different from each other. A user can utilize an image retrieving and delivering system through one of the clients. The client-side terminals access to networks different from each other. For example, one personal computer is directly connected to one network of an internet protocol (IP) base, and another personal computer is connected to another network through an already-existing telephone line such as Integrated Services Digital Network (ISDN). Both the portable telephone and the portable information terminal are connected to a radio type network (for example, IMT-2000). The digital television is connected to a dedicated cable, a terrestrial television broadcasting network or a satellite television broadcasting network.

Figure 2:
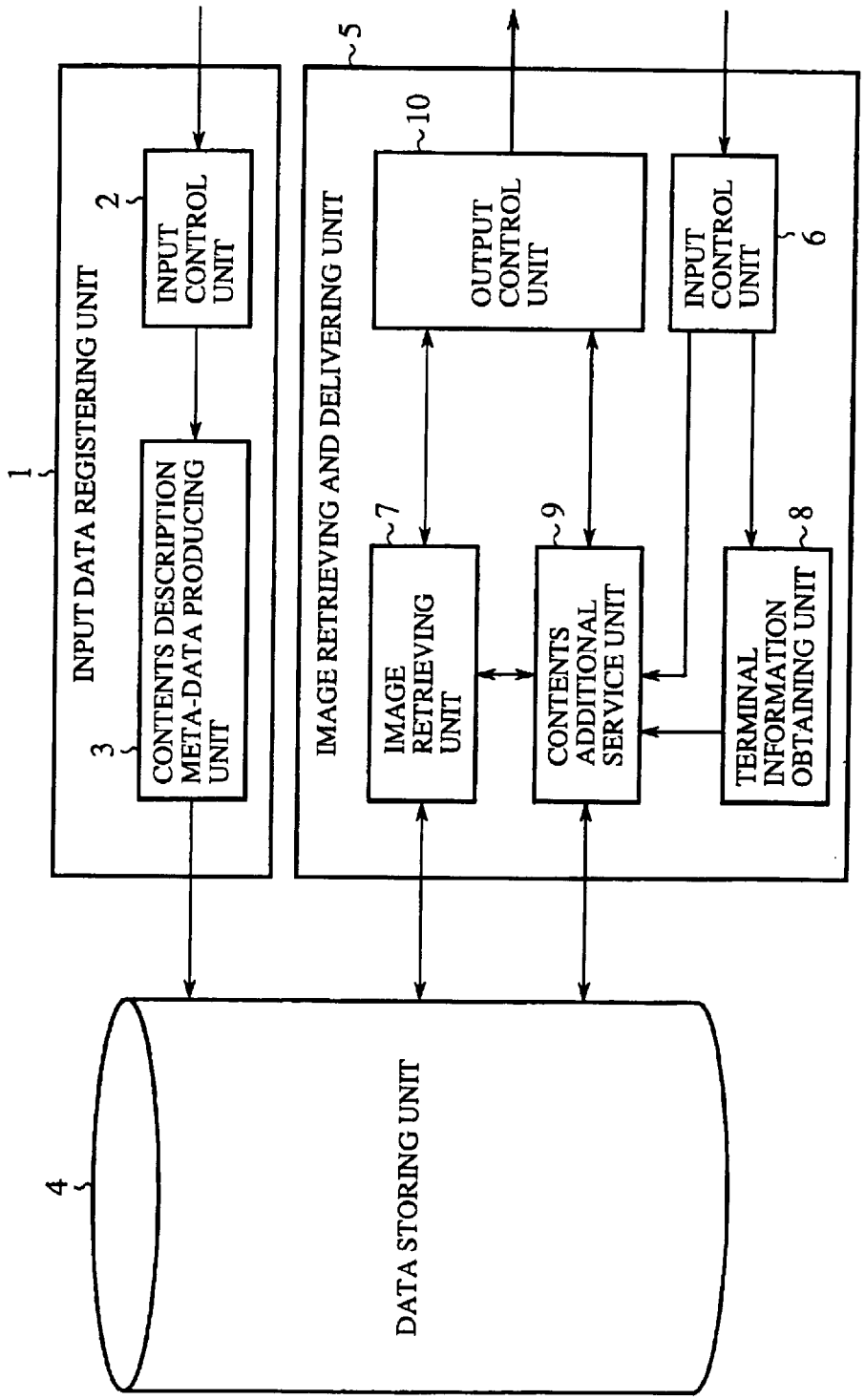
FIG. 2 is a diagram showing the configuration of a server in the image retrieving and delivering system according to a first embodiment of the present invention.

FIG. 2 is a diagram showing the configuration of a server in the image retrieving and delivering system according to a first embodiment of the present invention. In FIG. 2, 1 indicates an input data registering unit for receiving an input image and registering the input image in a data base, and the input data registering unit 1 comprises an input control unit 2 and a contents description meta-data producing unit 3. 2 indicates the input control unit for receiving the input image, 3 indicates the contents description meta-data producing unit for performing an image-processing for the input image transmitted from the input control unit 2 to extract a feature degree and producing meta-data in which the feature degree is described. 4 indicates a data storing unit for storing both the meta-data produced in the contents description meta-data producing unit 3 and the input image, 5 indicates an image retrieving and delivering unit for retrieving image data satisfying a user's request from the data storing unit 4 and delivering the image data obtained as a retrieval result to a terminal used by the user, 6 indicates an input control unit for receiving a retrieval request output from the terminal used by the user, 7 indicates an image retrieving unit for retrieving the image data satisfying the user's request by using the meta-data, in which the feature degree is described, retrieved from the data storing unit 4, 8 indicates a terminal information obtaining unit for obtaining information of the reception terminal used by the user, 9 indicates a contents additional service unit for performing an additional service by converting the image data obtained as the retrieval result in the image retrieving unit 7 into information suitable for a processing capability of the terminal used by the user, and 10 indicates an output control unit for delivering the image data of the retrieval result output from the image retrieving unit 7 and the contents additional service unit 9 to the reception terminal of the user.

Next, an operation is described in detail.

First, a processing operation of the input data registering unit is described in detail.

Figure 3:
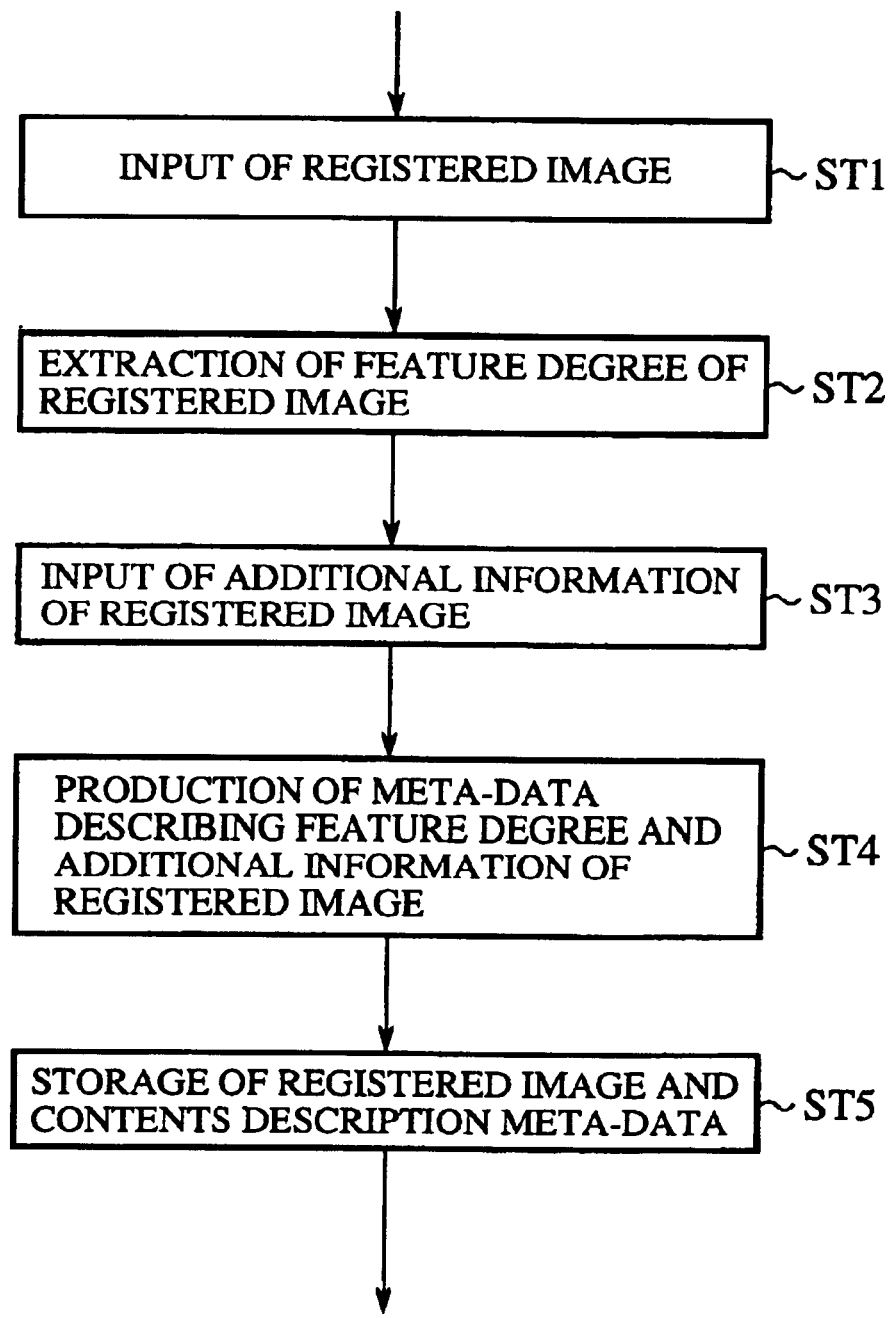
FIG. 3 is a flow chart showing a data base registering operation performed in an input data registering unit of the image retrieving and delivering system according to the first embodiment of the present invention.

FIG. 3 is a flow chart showing an operation for registering a new input image of the input data registering unit in the data base in the image retrieving and delivering system according to the first embodiment of the present invention. Here, a new input image is transmitted from one terminal of a client side through one network or is directly input to a server having the input data registering unit. An example in which a new input image is transmitted from one terminal of the client side through one network is the situation in which an image photographed by a portable telephone having a camera or an image received by video mail is registered in a server. As is described above, the input control unit 2 has an interface for receiving the image through a network and an interface for directly receiving the image.

In a step ST1, an input image to be newly registered is received in the input control unit 2 and is output to the contents description meta-data producing unit 3. In the contents description meta-data producing unit 3, when the input image is received, an image processing is performed for the input image to extract a feature degree from the input image (step ST2). Here, a color, a texture, a motion or a shape in the input image is, for example, extracted as a feature degree. In this case, it is applicable that a conventional image feature extracting technique for extracting the feature degree of the input image be used in order to extract the feature degree.

Thereafter, a keyword describing the feature of the input image and additional information of the input image are extracted in the contents description meta-data producing unit 3. Here, information relating to a format of the input image such as a coding method (MPEG-1, MPEG-2, MPEG-4, JPEG or the like) of the input image, a bit rate, a frame rate, a resolution degree and a file size, information relating to a copyright of the input image or information relating to a distribution condition (free distribution or charged distribution) of contents of the input image is, for example, extracted as additional information.

Thereafter, in the contents description meta-data producing unit 3, the feature degree and the additional information of the extracted input image are described according to a format defined in advance, and contents description meta-data (feature descriptor) is produced (step ST4).

Finally, in the contents description meta-data producing unit 3, the input image and the contents description meta-data produced in the step ST4 are stored in the data storing unit 4 (step ST5). Therefore, the new input image can be registered in the data base of the data storing unit 4.

Next, a processing operation of the image retrieving and delivering unit 5 is described in detail.

Figure 4:
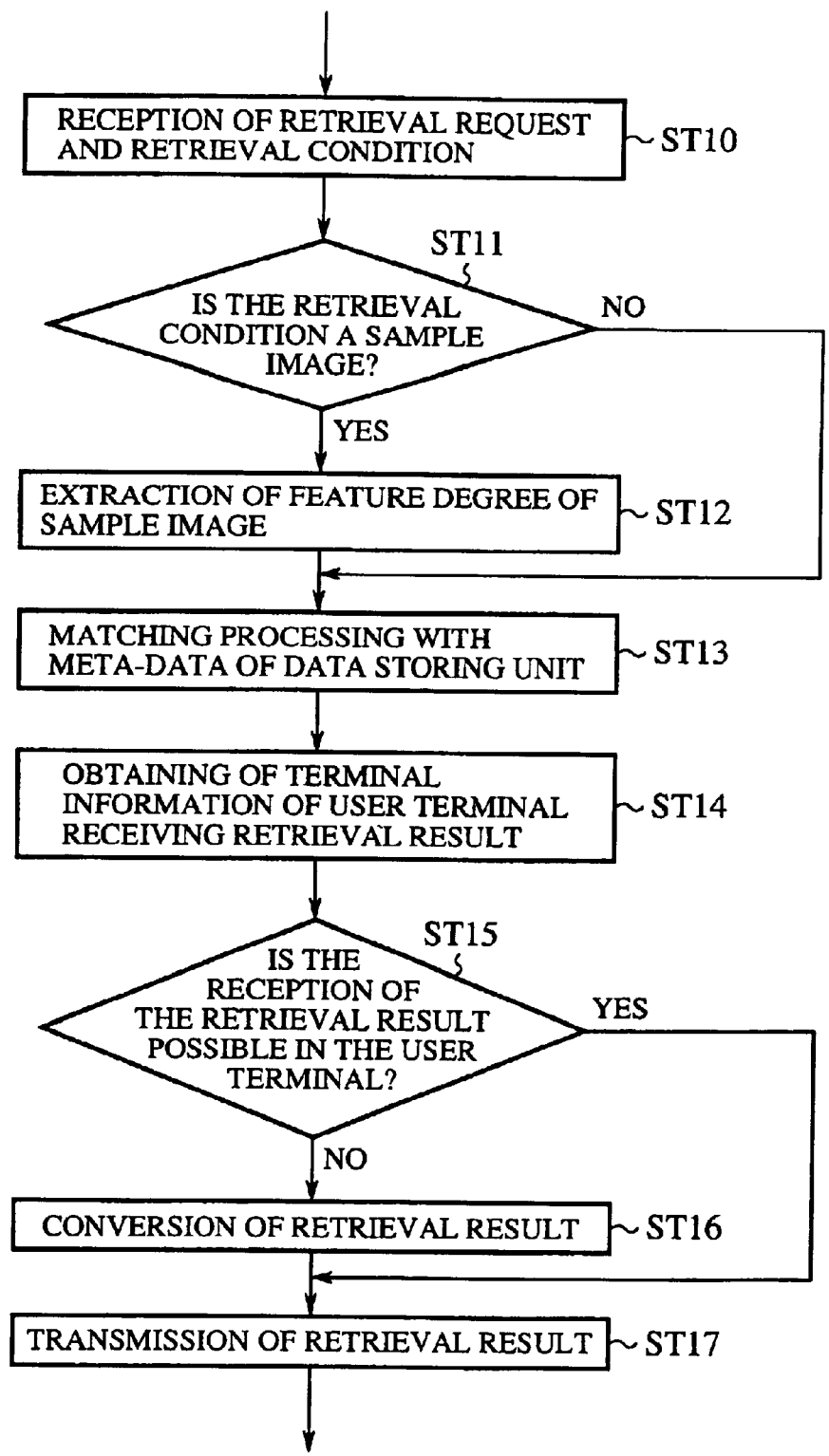
FIG. 4 is a flow chart showing a processing operation of an image retrieving and delivering unit of the image retrieving and delivering system according to the first embodiment of the present invention.

FIG. 4 is a flow chart showing a processing operation of the image retrieving and delivering unit of the image retrieving and delivering system according to the first embodiment of the present invention.

First, a retrieval request of an image and a retrieval condition are received in the input control unit 6 from a user through one network (step ST10), and the retrieval condition of the user is output to the image retrieving unit 7. Here, a keyword directly indicating the image to be retrieved, meta-data describing the feature degree of the image to be retrieved or a sample image is specified by the user as a retrieval condition.

In the image retrieving unit 7, it is judged whether or not the retrieval condition input from the input control unit 6 indicates a sample image. In cases where the retrieval condition does not indicate a sample image, the procedure proceeds toa step ST13, a matching processing for the meta-data of the data storing unit 4 is performed. In cases where the retrieval condition indicates a sample image, the procedure proceeds to a step ST12, and an extraction operation for a feature degree of the sample image is performed (step ST11).

In cases where the retrieval condition indicates a sample image in the step ST11, a feature degree such as a color, a texture, a motion or a shape in the sample image is extracted from the sample image in the image retrieving unit 7, and meta-data describing the feature degree is produced (step ST12).

Thereafter, in the image retrieving unit 7, a matching processing of a keyword of the retrieval condition and the feature degree of the retrieval condition for a keyword and a feature degree described in each piece of contents description meta-data of the data storing unit 4 is performed, and image data requested by the user is obtained as a retrieval result (step ST13).

Thereafter, in the terminal information obtaining unit 8, information of a user terminal, in which the image data obtained as the retrieval result is to be received, is obtained (step ST14). The terminal information is transmitted simultaneously with the transmission of the retrieval condition and is obtained in the image retrieving and delivering unit 5 through the input control unit 6. Also, in case of a server having a user registration function, it is applicable that the user register in advance his terminal information in the server at a time of the user registration and the terminal information registered in the server be obtained in the image retrieving and delivering unit 5 at a time of the retrieval.

When the terminal information is obtained in the terminal information obtaining unit 8, the terminal information is output to the contents additional service unit 9. In the contents additional service unit 9, when the terminal information of the user is received, the judgment whether or not the reception of the image data of the retrieval result obtained in the step ST13 is possible in the user terminal is performed to perform a processing for transmitting the image data of the retrieval result to the user terminal by processing the procedure to a step ST17 in cases where the reception is possible and to perform a processing for converting the image data of the retrieval result by proceeding the procedure to a step ST16 in cases where the reception is impossible (step ST15). As is described above, the terminal information of the user terminal is used as a delivery condition for delivering the retrieval result.

In cases where it is judged in the step ST15 that the reception of the image data of the retrieval result is possible in the user terminal, the contents addition service unit 9 controls the image retrieving unit 7 to make the image retrieving unit 7 transmit the image data of the retrieval result to the user terminal through the output control unit 10 (step ST17).

Also, in cases where it is judged in the step ST15 that the reception of the image data of the retrieval result is impossible in the user terminal, the image retrieving unit 7 outputs the image data of the retrieval result to the contents addition service unit 9. In the contents addition service unit 9, when the image data of the retrieval result is received, an output format of the image data is converted according to a processing capability of the user terminal and a network type (step ST16).

Here, an operation of the image retrieving and delivering unit 5 according to the first embodiment is described in detail while citing a specific example. For example, a case that a user accesses to a server having a multimedia picture book and searches the multimedia picture book to examine a name of a fish or the ecology of the fish according to an image of the fish photographed by a digital video camera is considered. In this case, a retrieval condition used for the searching of the multimedia picture book is the photographed image of the fish. In cases where the photographed image of the fish is transmitted by using a portable telephone to receive a retrieval result by using the portable telephone, the image of the fish denoting an input image is converted into an image of a data format (MPEG-4 or the like), which can be transmitted and received by using the portable telephone, and is transmitted. The image of the fish denoting the input image is input to the image retrieving unit 7 through the input control unit 6. In the image retrieving unit 7, a feature degree such as a shape of the fish, a color of the fish, a motion of the fish or a texture of the fish is extracted from the image of the fish denoting the input image. Thereafter, a processing of the matching with the feature degree, which is described in each piece of contents description meta-data stored in the data storing unit 4, is performed for the extracted feature degree, and image data of each fish having a feature similar to the extracted feature degree is obtained.

Figure 5B:
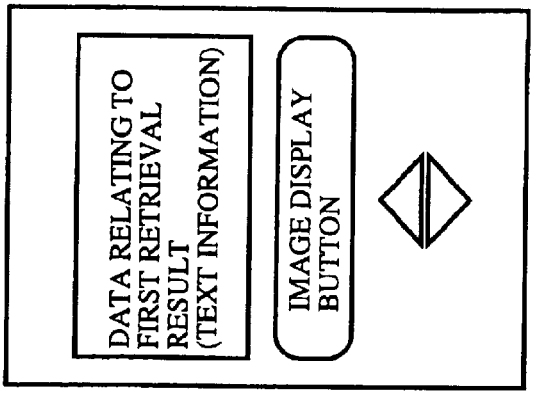
FIG. 5B is a diagram showing a display example of a retrieval result in a client-side terminal (formed of a portable telephone) of the image retrieving and delivering system according to the first embodiment of the present invention.
Figure 5A:
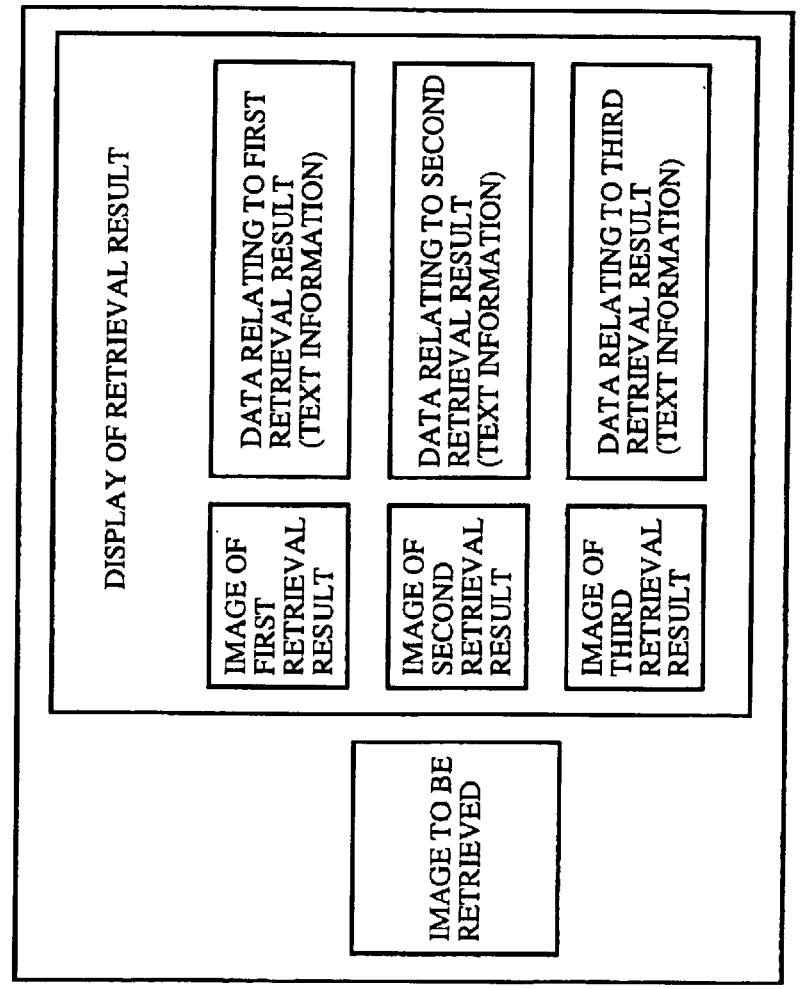
FIG. 5A is a diagram showing a display example of a retrieval result in a client-side terminal (formed of a personal computer) of the image retrieving and delivering system according to the first embodiment of the present invention.

FIG. 5 is a diagram showing a display example of image data of a retrieval result in a client-side terminal used in the image retrieving and delivering system according to the first embodiment, (a) shows a case that the client-side terminal is formed of a personal computer, and (b) shows a case that the client-side terminal is formed of a portable telephone. As shown in FIG. 5(*a*), in cases where image data is transmitted to a terminal such as a personal computer in which a processing capability of an image display is sufficient, image data composed of images (an image of a first retrieval result, an image of a second retrieval result and an image of a third retrieval result) of a plurality of fishes having features similar to that of the input image and data (for example, names of the fishes and text information relating to the ecology of each fish) relating to the fishes is transmitted to the personal computer.

In contrast, as shown in FIG. 5(*b*), in cases where image data is transmitted to a terminal such as a portable telephone in which a display area is small or a functional burden is high when many pieces of information are delivered, image data composed of data (text information) relating to a fish and link information (location information of a server in which an image of the fish exists) to an image of the fish is transmitted. In cases where the user selects the image of the fish, the image of the fish is delivered and displayed (in the example of FIG. 5(*b*), in cases where "image display button" is pushed, the image data of the first retrieval result can be delivered according to the link information).

Also, in the contents additional service unit 9, a processing such as a format conversion is performed for a to-be-transmitted image to convert a format of the image into a format suitable for a processing capability of the reception terminal. For example, in the server having the multimedia picture book, the coding method of the image is set to MPEG-1, and the resolution degree of the image is set to 352*240 pixels. In contrast, in cases where the coding method, at which the reception of data in the portable telephone is possible, is MPEG-4 and a display size of the display of the portable telephone is 176*144 pixels, in the contents additional service unit 9, the format of the image is converted into an image format, in which the reception of the image is possible in the portable telephone, by converting the coding method of the image and the resolution degree of the image.

Here, the coding method and the resolution degree are described as an example. However, it is applicable that a bit rate or a frame rate be converted to convert the format of the image in the contents additional service unit 9.

Also, in cases where a file size of contents (that is, image data) to be delivered to the user terminal is, for example, larger than an upper limit set by the user, a processing for transmitting a portion of the contents is performed.

Therefore, the contents converted in the contents additional service unit 9 is transmitted through the output control unit 10.

It is applicable that the server relating to the input data registering unit 1 be different from that relating to the image retrieving and delivering unit 5. Also, the production of the contents description meta-data in the input data registering unit 1 described above is not performed, but it is applicable that contents description meta-data separately produced by a contents producer be registered with an image relating to the contents description meta-data. In addition, it is applicable that meta-data describing a feature degree of an image be produced by a contents producer and meta-data describing a distribution condition be produced in a server from which contents are to be delivered.

Next, the client-side terminal is described.

Figure 6:
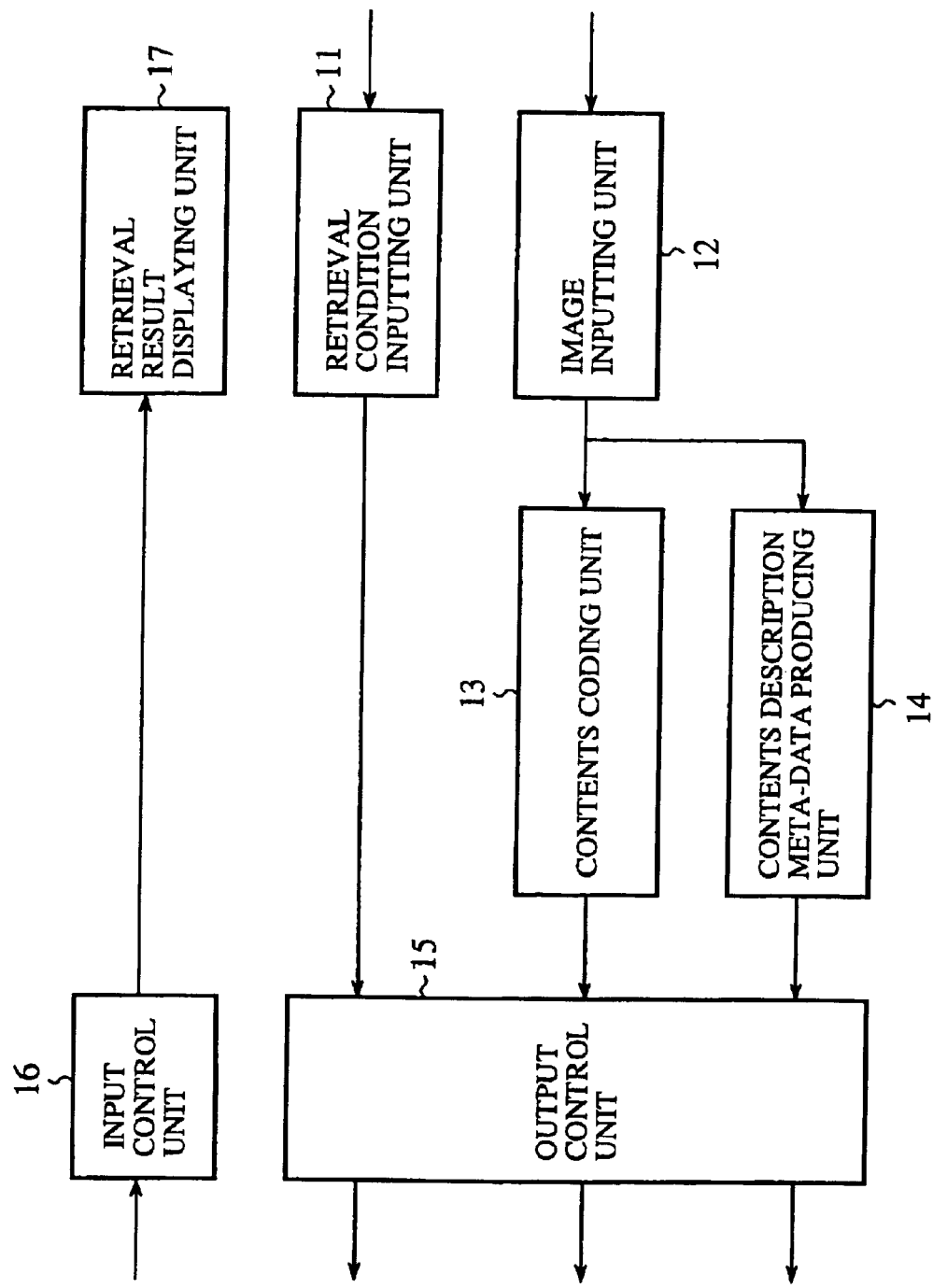
FIG. 6 is a diagram showing a configuration example of the client-side terminal used for the image retrieving and delivering system according to the first embodiment of the present invention.

FIG. 6 is a diagram showing a configuration example of the client-side terminal used in the image retrieving and delivering system according to the first embodiment of the present invention. In FIG. 6, 11 indicates a retrieval condition inputting unit in which the user inputs a retrieval condition, 12 indicates an image inputting unit for obtaining an image from a camera, and 13 indicates a contents coding unit for coding the image taken in the image inputting unit 12 at a coding method which makes the image possible to be transmitted through a network, 14 indicates a contents description meta-data producing unit for extracting a feature degree from the image taken in the image inputting unit 12 and producing meta-data describing the extracted feature degree, 15 indicates an output control unit for transmitting the retrieval condition input by the user, the input image and the meta-data describing the feature degree of the input image to a server, 16 indicates an input control unit for receiving a retrieval result transmitted from the server, and 17 indicates a retrieval result displaying unit for displaying the retrieval result.

Next, the processing in each unit is described.

A case that a sample image is given as a retrieval condition and an image similar to the sample image is retrieved is described as an example.

An image obtained by photographing an object with a camera by a user is taken in the image inputting unit 12 as a sample image. In cases where the taken-in image is transmitted to a server, the input image is output from the image inputting unit 12 to the contents coding unit 13. In the contents coding unit 13, the input image is coded at a coding method which makes the input image possible to be transmitted through a network. For example, in cases where the input image is transmitted from a portable telephone of a transmission terminal to the server in a radio communication, the input image is coded to a coded image according to MPEG-4 coding method. The coded image is transmitted to the server through the output control unit 15.

Also, in cases where the taken-in image is not directly transmitted to the server but a feature degree is extracted from the taken-in image on the client side to transmit meta-data describing the feature degree to the server, the input image is output from the image inputting unit 12 to the contents description meta-data producing unit 14. In the contents description meta-data producing unit 14, a feature degree of the input image is extracted, and meta-data describing the feature degree is produced. The produced meta-data describing the feature degree is transmitted to the server through the output control unit 5.

When a retrieval condition of a text base such as a keyword is input to the retrieval condition inputting unit 11 by the user, the retrieval condition is transmitted from the retrieval condition inputting unit 11 to the server through the output control unit 5.

Therefore, a retrieval result, which is obtained by performing the retrieval in the server and is transmitted to the client, is received through the input control unit 16 and is displayed in the retrieval result displaying unit 17.

In cases where the feature degree of the sample image is extracted in another terminal, it is applicable that meta-data describing the feature degree is input to the retrieval condition inputting unit 11.

Also, in cases where the feature degree of the input image is extracted on the server side to produce meta-data describing the feature degree on the server side, the contents description meta-data producing unit 14 can be omitted.

In addition, it is not required to perform the processing corresponding to a processing capability of the transmission terminal (server) in the image inputting unit 12, the contents coding unit 13 and the contents description meta-data producing unit 14.

As is described above, in the first embodiment, because an output format of the retrieval result and a format of the output image can be converted according to the processing capability of the reception terminal on the server side in response to the retrieval request transmitted from the client, a retrieval result can be easily displayed in each of various terminals having processing capabilities different from each other.

Embodiment 2

In the first embodiment, in cases where the retrieval result cannot be displayed in the user terminal, an example in which an output image is output is described. The format of the output image is converted in the contents additional service unit so as to make the user terminal possible to display the output image, However, in a second embodiment, a retrieval result, of which the display is impossible in the user terminal, is removed from the output result in the contents additional service unit.

Though an image retrieving and delivering system according to the second embodiment has fundamentally the same configuration as that of the first embodiment, operations of the image retrieving unit 7 and the contents additional service unit 9 differ from those of the first embodiment. Therefore, operations of the image retrieving unit 7 and the contents additional service unit 9 are described.

For example, a case that image data of a retrieval result is transmitted to a portable telephone is considered. Here, a coding method of image possible to be received in the portable telephone is MPEG-4 (Here, terminal information denoting a delivery condition is transmitted to the server side simultaneously with the transmission of the retrieval request). Pieces of image data of the data storing unit 4 are retrieved in the image retrieving unit 7 according to the retrieval condition transmitted from the user in the same manner as in the first embodiment, and each piece of image data composed of contents and meta-data describing additional information of the contents is output to the contents additional service unit 9 as a retrieval result. In the contents additional service unit 9, when each piece of image data is received, the meta-data describing the additional information is analyzed, and the piece of image data, in which the coding method of the contents is MPEG-4, is extracted. The pieces of extracted image data of the retrieval results are transmitted to the user terminal of the client through the output control unit 10.

In cases where text information describing the contents, which is removed from the output result because the coding method of the contents is not suitable for the processing capability of the reception terminal, exists in the additional information, it is applicable that the text information be transmitted to the user terminal in place of the image.

In the above, the coding method is described as an example. However, an image format is applicable in the same manner as the coding method.

As is described above, in the second embodiment, because a retrieval result, of which the reception is impossible in the reception terminal in response to the retrieval request transmitted from the client, is removed from the output result on the server side or because contents such as text information are transmitted to the reception terminal in place of the retrieval result, the retrieval result can be easily displayed in each of various terminals having processing capabilities different from each other.

Embodiment 3

In the first embodiment or the second embodiment, in cases where contents of a retrieval result obtained in the image retrieving unit 7 are formed in a format, in which the display of the contents of the retrieval result is impossible in the reception terminal, an example that the format conversion is performed for the contents of the retrieval result in the contents additional service unit, an example that the contents of the retrieval result is removed from the output result and an example that substitutive contents such as text information are transmitted to the reception terminal are described. However, in a third embodiment, a contents additional service unit has a function in which the contents of the retrieval result is transmitted to another terminal specified by the user.

Though an image retrieving and delivering system according to the third embodiment has fundamentally the same configuration as that of the first embodiment, an operation of a contents additional service unit differs from that of the first embodiment. Therefore, an operation of a contents additional service unit is described.

For example, to transmit contents of a retrieval result to a portable telephone, in the contents additional service unit 9, contents corresponding to the coding method of MPEG-2 in the server is converted into that of MPEG-4 and is transmitted to the reception terminal. In this case, the contents of MPEG-2 originally retrieved is also transmitted to a terminal (for example, a personal computer terminal) which is specified by the user and can receive the contents of MPEG-2. Also, it is applicable that the user specify whether or not the contents of MPEG-2 originally retrieved is transmitted to a terminal which can receive the contents of MPEG-2.

As is described above, in the third embodiment, in cases where a retrieval result, which is impossible to be received in the reception terminal in response to the retrieval request transmitted from the client, is format-converted or is removed from the output result or in cases where substitutive contents is transmitted to the reception terminal, because the contents of MPEG-2 originally retrieved can be transmitted to a terminal specified by an instruction of the user, the retrieval result can be easily displayed in each of various terminals having processing capabilities different from each other.

Embodiment 4

In the first embodiment or the second embodiment, in cases where contents of a retrieval result obtained in the image retrieving unit 7 are formed in a format in which the display of the contents of the retrieval result is impossible in the reception terminal, an example that the format conversion is performed for the contents of the retrieval result in the contents additional service unit, an example that the contents of the retrieval result is removed from the output result and an example that substitutive contents such as text information are transmitted to the reception terminal are described. However, in a fourth embodiment, in cases where the user cannot receive the contents of the retrieval result obtained in the image retrieving unit 7, a substitutive process can be selected, a substitutive process is determined in advance for each piece of contents, or a substitutive process is specified in advance by a server.

An outline is described. First, in a case that a substitutive process can be selected in cases where the user cannot receive contents of a retrieval result obtained in the image retrieving unit 7, before the retrieval result obtained in the image retrieving unit 7 is transmitted, text information, in which a plurality of items of substitutive processes to be selected in the contents additional service unit 9 are described, is, for example, produced, and the text information and the contents description meta-data relating to the image of the retrieval result are transmitted to the user terminal through the output control unit 10. Therefore, the user judges according to the contents description meta-data that the reception of the image data of the retrieval result is impossible, and a desired process is selected from the text information in which the items of the substitutive processes are described.

Secondly, in a case that a substitutive process is determined in advance for each piece of contents, information, in which a contents producer describes a substitute process according to a coding method of contents or/and a file size of the contents for each piece of contents, is, for example, stored in the data storing unit 4 as contents description meta-data. Therefore, in cases where the user cannot receive contents retrieved, a substitute process is performed in the contents additional service unit 9 according to the information relating to the substitute process of the contents stored in the data storing unit 4.

Thirdly, in a case that a substitutive process is specified in advance by a server, a substitutive process is, for example, stored in the data storing unit 4 of a server. In cases where the user cannot receive a retrieval result from the server when the user sends a retrieval request to the server, the substitutive process is performed in the contents additional service unit 9.

Also, in a case that a substitutive process is specified in advance by a user, the selected substitutive process is stored in a terminal of the user or is stored in a user area in cases where the user area exists in the server, and a storing condition is reflected in a next retrieval and the retrieval following the next retrieval. Therefore, the retrieval suitable for a user's taste can be performed. Also, other retrieval conditions specified by the user are reflected in the same manner.

As is described above, in the fourth embodiment, because the substitute process can be specified for each user, each server or each piece of contents in cases where the retrieval result cannot be received in the reception terminal of the user, the retrieval can be performed while reflecting the intention of the user, the server or the contents producer.

Embodiment 5

In the fifth embodiment, in cases where copyright information and/or a distribution condition (free or charged) of contents are described in the contents description meta-data, the retrieval and delivering is performed while using the copyright information and/or the distribution condition.

Though the configuration of a server and a client of an image retrieving and delivering system according to the fifth embodiment is the same as those shown in FIG. 1 and FIG. 6, a processing operation in the contents additional service unit 9 differs from that of the first embodiment. Therefore, a processing operation in the contents additional service unit 9 is described in detail.

For example, in cases where a condition "pieces of contents of the free distribution and free from copyright are retrieved" is specified according to a specification condition of the user, contents description meta-data attached to contents of a retrieval result is analyzed in the contents additional service unit 9 each time the retrieval result is obtained in the image retrieving unit 7, and pieces of contents of the free distribution and free from copyright are extracted. The pieces of extracted contents are transmitted to the user through the output control unit 10.

Also, in cases where pieces of charged contents are retrieved, each piece of charged contents is not delivered as a retrieval result, but a piece of contents corresponding to an advertisement of each piece of charged contents is transmitted. For example, in cases where the piece of charged contents indicates a "movie", the piece of contents corresponding to the advertisement of the piece of charged contents indicates contents such as "preview of the movie" in which a plurality of representative scenes are collected. The pieces of advertising contents are transmitted to the user terminal through the output control unit 10, and the user watches the pieces of advertising contents. In cases where the user determines to purchase one piece of charged contents, the user sends a purchase instruction to the server, so that the user can receive the piece of charged contents. In this case, it is applicable that the user specify a terminal, in which the pieces of advertising contents are to be received, and a terminal in which the piece of purchased contents is to be received. For example, it is possible that the pieces of advertising contents are received in a portable telephone and the piece of purchased contents is received in a personal computer specified by the user.

As is described above, in the fifth embodiment, because each piece of contents can be retrieved by using the copyright information and the distribution condition described in the contents description meta-data attached to the piece of contents, the user can easily retrieve a piece of desired contents from various kinds of contents.

Embodiment 6

In the first to fourth embodiments, the contents description meta-data attached to each piece of contents is analyzed on the server side, and the format conversion of the piece of contents and the filtering of the retrieval results are performed according to the retrieval condition of the user and the processing capability of the reception terminal. However, in a sixth embodiment, the piece of contents and the contents description meta-data are transmitted from the server side, the contents description meta-data is analyzed on the client side, and a process that the piece of contents is not received in cases where the piece of contents exceeds the capability of the reception terminal or does not satisfy the retrieval condition of the user is performed on the client side.

Figure 7:
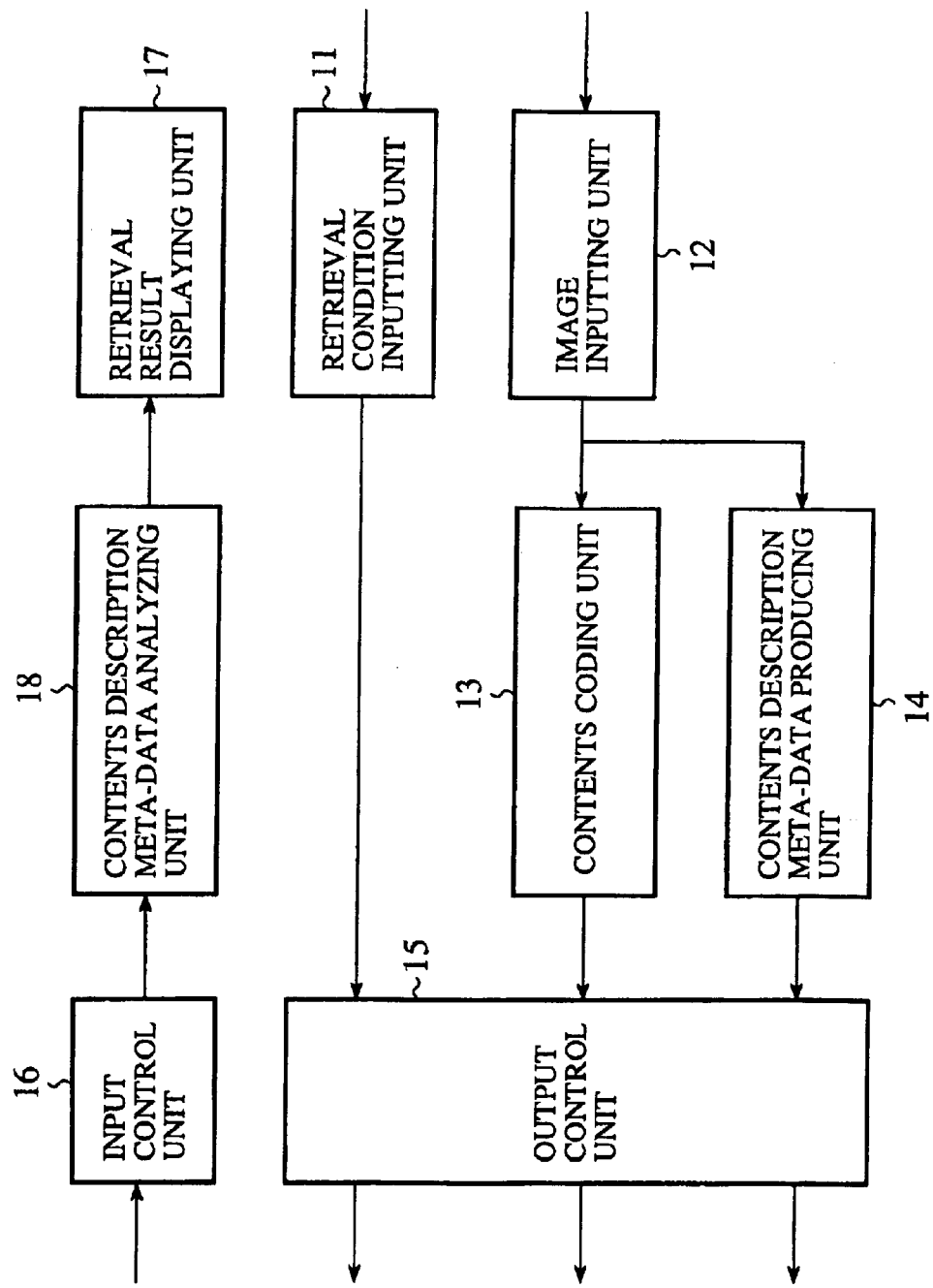
FIG. 7 is a diagram showing the configuration of a client in an image retrieving and delivering system according to a sixth embodiment of the present invention.

FIG. 7 is a diagram showing the configuration of a client in an image retrieving and delivering system according to a sixth embodiment of the present invention. In FIG. 7, 18 indicates a contents description meta-data analyzing unit for analyzing contents description meta-data. Here, each constitutional element, which is the same as that shown in FIG. 6, is indicated by the same reference sign as that attached to the constitutional element shown in FIG. 6, and the duplicated description is omitted.

An outline is described.

In the user terminal of the client, contents description meta-data, in which the feature of contents of a retrieval result is described, is received from the server. The received contents description meta-data is input to the contents description meta-data analyzing unit 18, and the format of the contents of the retrieval result is examined. In cases where the format denotes a format at which the reception of the contents of the retrieval result is possible in the user terminal, the user terminal of the client sends a contents transmission request to the server, and the reception of the contents is performed. In contrast, in cases where the format denotes a format at which the reception of the contents of the retrieval result is impossible in the user terminal, the reception of the contents is not performed.

Here, in cases where the reception of the contents of the retrieval result is impossible in the user terminal, in the same manner as in the fourth embodiment, it is applicable that the user can select a substitute process.

As is described above, in the sixth embodiment, because the client analyzes the meta-data in which the feature of the contents and the format of the contents are described, the client can judge whether or not the reception of the contents is possible in the client terminal, so that the retrieval result can be easily displayed in each of various terminals having processing capabilities different from each other.

Accordingly, in an image retrieving and delivering system and an image retrieving and delivering method according to the present invention, image data of a retrieval result can be delivered in a format corresponding to a processing capability of each of various types of terminals (for example, a portable telephone, a visual television and a personal computer) to the terminal through one of various types of networks such as radio type network.

What is claimed is:

1. An image retrieving and delivering method, comprising:
   an image retrieving step of retrieving a feature descriptor or a plurality of feature descriptors of an image registered in a data base according to a retrieval condition input by a user and obtaining a retrieval result satisfying the retrieval condition;
   an output control step of transmitting the retrieval result and the feature descriptor or the feature descriptors relating to the retrieval result to a user terminal; and
   a contents description meta-data analyzing step of analyzing the feature descriptor or the feature descriptors transmitted in the output control step and determining on the user terminal side whether or not the retrieval result is to be received,
   wherein the retrieval result contains an image format that includes at least one of a coding method of an image of the retrieval result, a bit rate, a frame rate, a resolution degree, and a file size.

2. An image retrieving and delivering system, comprising:
   a data base for registering an image including a moving picture or a static picture with a feature descriptor or a plurality of feature descriptors of the image;
   image retrieving means for retrieving the feature descriptor or the feature descriptors registered in the data base according to a retrieval condition input by a user and obtaining a retrieval result satisfying the retrieval condition;
   output control means for transmitting the feature descriptor or the feature descriptors relating to the retrieval result to a user terminal prior to the retrieval result;
   contents description meta-data analyzing means, arranged in the user terminal, for analyzing the feature descriptor or the feature descriptors transmitted from the output control means and determining whether or not the retrieval result is to be received; and
   a transmitter for transmitting, in case where the retrieval result is to be received, the retrieval result in response to a transmission request,
   wherein the retrieval result contains an image format that includes at least one of a coding method of an image of the retrieval result, a bit rate, a frame rate, a resolution degree, and a file size.

3. An image retrieving and delivering server for delivering image data to various types of user terminals, comprising:
   a data base for registering an image including a moving picture or a static picture with a feature descriptor or a plurality of feature descriptors of the image;
   image retrieving means for retrieving the feature descriptor or the feature descriptors registered in the data base according to a retrieval condition input by one of the various types of users and obtaining a retrieval result satisfying the retrieval condition; and
   contents additional service means for editing and processing the retrieval result and an image format according to a delivery condition obtained from the one of the various types of the user terminals in order to deliver the retrieval result,
   wherein each of the user terminals has a processing capability according to the type of user terminal, and
   wherein the delivery condition specifies the processing capability of each user terminal, and
   wherein the image format includes at least one of a coding method of the image of the retrieval result, a bit rate, a frame rate, a resolution degree and a file size.

4. An image retrieving and delivering server according to claim 3, wherein the contents additional service means produces data, which relates to the retrieval result and of which the reception in the user terminal is possible, according to the delivery condition specified by the user and transmits the data to the user terminal before the transmission of the retrieval result.

5. An image retrieving and delivering server according to claim 3 further comprising:
   contents description meta-data producing means for extracting a feature degree of each of a plurality of input images and format information of the input image and producing a feature descriptor or a plurality of feature descriptors of each input image; and
   data storing unit for registering the feature descriptor or feature descriptors produced by the contents description meta-data producing means and the input image relating to the feature descriptor or the feature descriptors in the data base.

6. An image retrieving and delivering server according to claim 3, wherein the contents additional service means comprises at least one of:
   converting means for converting an image format and an output format in the image of the retrieval result into those suitable for the terminal information of the user terminal;
   filtering means for performing no transmission of the retrieval result which does not suit the terminal information; and
   replacing means for replacing the retrieval result not suitable for the terminal information with substitute data suitable for the terminal information.

7. An image retrieving and delivering server according to claim 3, wherein the contents additional service means transmits the retrieval result, which is not edited or processed, to another terminal specified by the user in advance when the retrieval result is edited and processed according to the terminal information of the user terminal.

8. An image retrieving and delivering server for delivering image data to various types of user terminals, comprising:
   a data base for registering an image including a moving picture or a static picture with a feature descriptor or a plurality of feature descriptors of the image;
   image retrieving means for retrieving the feature descriptor or the feature descriptors registered in the data base according to a retrieval condition input by one of the various types of users and obtaining a retrieval result satisfying the retrieval condition; and
   contents additional service means for editing and processing the retrieval result according to a delivery condition obtained from the one of the various types of the user terminals in order to deliver the retrieval result,
   wherein each of the user terminals has a processing capability according to the type of user terminal, and wherein the delivery condition specifies the processing capability of each user terminal, and
   wherein the contents additional service means comprises a plurality of editing means for respectively editing and processing the retrieval result not suitable for terminal information obtained from the user terminal, and the plurality of editing means are properly selectable in one of an image retrieval requiring side, an image retrieval performing side and a contents providing side on which the images are registered in the data base.

9. An image retrieving and delivering server according to claim 8, wherein the contents additional service means produces data, which relates to the retrieval result and of which the reception in the user terminal is possible, according to the delivery condition specified by the user and transmits the data to the user terminal before the transmission of the retrieval result.

10. An image retrieving and delivering server according to claim 9, wherein the contents additional service means produces the data, which relates to the retrieval result and of which the reception in the user terminal is possible, according to copyright information and/or a distribution condition of the image of the retrieval result.

11. An image retrieving and delivering server according to claim 8, further comprising:
   contents description meta-data producing means for extracting a feature degree of each of a plurality of input images and format information of the input image and producing a feature descriptor or a plurality of feature descriptors of each input image; and
   data storing unit for registering the feature descriptor or feature descriptors produced by the contents description meta-data producing means and the input image relating to the feature descriptor or the feature descriptors in the data base.

12. An image retrieving and delivering server according to claim 8, wherein the contents additional service means comprises at least one of:
   converting means for converting an image format and an output format in the image of the retrieval result into those suitable for the terminal information of the user terminal;
   filtering means for performing no transmission of the retrieval result which does not suit the terminal information; and
   replacing means for replacing the retrieval result not suitable for the terminal information with substitute data suitable for the terminal information.

13. An image retrieving and delivering server according to claim 8, wherein the contents additional service means transmits the retrieval result, which is not edited or processed, to another terminal specified by the user in advance when the retrieval result is edited and processed according to the terminal information of the user terminal.

14. An image retrieving and delivering method for delivering image data to various types of user terminals, comprising:
   an image retrieving step of retrieving a feature descriptor or a plurality of feature descriptors of an image registered in a data base according to a retrieval condition input by one of the various types of user terminals and obtaining a retrieval result satisfying the retrieval condition; and
   a contents additional service step of editing and processing the retrieval result according to a delivering condition obtained from the one of the various types of the user terminals in order to deliver the retrieved results,
   wherein each of the user terminals has a processing capability according to the type of user terminal, and wherein the delivery condition specifies the processing capability of each user terminal, and
   wherein the retrieval result contains an image format that includes at least one of a coding method of an image of the retrieval result, a bit rate, a frame rate, a resolution degree, and a file size.

15. An image retrieving and delivering method according to claim 14, wherein the contents additional service step includes a step of obtaining terminal information of the user terminal as the delivery condition.

16. An image retrieving and delivering method according to claim 15, wherein the contents additional service step includes at least one of a converting step of converting an image format and an output format in the image of the retrieval result into those suitable for the terminal information of the user terminal, a filtering step of performing no transmission of the retrieval result which does not suit the terminal information, and a replacing step of replacing the retrieval result not suitable for the terminal information with substitutive data suitable for the terminal information.

17. An image retrieving and delivering method according to claim 15, wherein the contents additional service step includes a step of transmitting the retrieval result, which is not edited or processed, to another terminal specified by the user in advance when the retrieval result is edited and processed according to the terminal information of the user terminal.

18. An image retrieving and delivering method according to claim 14, wherein the contents additional service step includes a step of producing data, which relates to the retrieval result and of which the reception in the user terminal is possible, according to the delivery condition specified by the user and a step of transmitting the data to the user terminal before the transmission of the retrieval result.

19. An image retrieving and delivering method according to claim 18, wherein the contents additional service step includes a step of producing the data, which relates to the retrieval result and of which the reception in the user terminal is possible, according to copyright information and/or a distribution condition of the image of the retrieval result.

20. An image retrieving and delivering method according to claim 14, further comprising:
    a contents description meta-data producing step of extracting a feature degree of the image and format information of the image when the image is input and producing the feature descriptor or the feature descriptors; and
    a data storing step of registering the feature descriptor or the feature descriptors produced in the contents description meta-data producing step and the input image in the data base.

21. An image retrieving and delivering system, comprising:
    a data base for registering each of a plurality of images including a moving picture and a static picture with a feature descriptor of the image;
    image retrieving means for retrieving one feature descriptor registered in the data base according to a retrieval condition input by a user and obtaining a retrieval result satisfying the retrieval condition; and
    contents additional service means for editing and processing the retrieval result according to a delivery condition obtained from a user terminal side which the retrieval result is to be received,
    wherein the contents additional service means further comprises:
        terminal information obtaining means for obtaining terminal information of the user terminal as the delivery condition; and
        a plurality of editing means for respectively editing and processing the retrieval result not suitable for the terminal information of the user terminal, and the plurality of editing means are properly selectable in one of an image retrieval requiring side, an image retrieval performing side and a contents providing side on which the images are registered in the data base;
    wherein the contents additional service means further comprises at least one of:
        converting means for converting an image format and an output format in the image of the retrieval result into those suitable for the terminal information of the user terminal;
        filtering means for performing no transmission of the retrieval result which does not suit the terminal information; and
        replacing means for replacing the retrieval result not suitable for the terminal information with substitutive data suitable for the terminal information.

22. An image retrieving and delivering system, comprising:
    a data base for registering each of a plurality of images including a moving picture and a static picture with a feature descriptor of the image;
    image retrieving means for retrieving one feature descriptor registered in the data base according to a retrieval condition input by a user and obtaining a retrieval result satisfying the retrieval condition; and
    contents additional service means for editing and processing the retrieval result according to a delivery condition obtained from a user terminal side which the retrieval result is to be received,
    wherein the contents additional service means further comprises:
        terminal information obtaining means for obtaining terminal information of the user terminal as the delivery condition;
    wherein the contents additional service means further comprises at least one of:
        converting means for converting an image format and an output format in the image of the retrieval result into those suitable for the terminal information of the user terminal;
        filtering means for performing no transmission of the retrieval result which does not suit the terminal information; and
        replacing means for replacing the retrieval result not suitable for the terminal information with substitutive data suitable for the terminal information, and
    wherein the image format includes at least one of a coding method of the image of the retrieval result, a bit rate, a frame rate, a resolution degree, and a file size.

* * * * *